(12) United States Patent
Hirzmann

(10) Patent No.: US 6,422,108 B1
(45) Date of Patent: Jul. 23, 2002

(54) ASSEMBLY CONSISTING OF A STEERING SHAFT AND A STEERING WHEEL

(75) Inventor: Guido Hirzmann, Sailauf (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/615,920

(22) Filed: Jul. 13, 2000

(30) Foreign Application Priority Data

Jul. 21, 1999 (DE) .......................... 299 12 741

(51) Int. Cl.[7] ................................. G05G 1/08
(52) U.S. Cl. ........................................... 74/522
(58) Field of Search .................... 74/522; 403/27, 403/321, 324, 325

(56) References Cited

U.S. PATENT DOCUMENTS

| | | | |
|---|---|---|---|
| 4,539,861 A | * 9/1985 | Nishikawa | 74/493 |
| 4,660,500 A | * 4/1987 | Zeller et al. | 116/31 |
| 5,010,962 A | * 4/1991 | Bloom, Jr. | 172/430 |
| 5,318,375 A | * 6/1994 | Entrup et al. | 403/359 |
| 5,577,859 A | * 11/1996 | Nau | 403/325 |
| 5,773,776 A | * 6/1998 | Uleski et al. | 200/61.27 |
| 5,855,449 A | * 1/1999 | Thomas | 403/262 |
| 5,913,634 A | * 6/1999 | Heilig | 403/374.1 |
| 6,109,651 A | * 8/2000 | Frisch | 280/776 |

FOREIGN PATENT DOCUMENTS

| | | | |
|---|---|---|---|
| AT | 377492 | 3/1985 | |
| DE | 3725689 A1 | 3/1988 | |
| JP | 55-78839 | * 6/1980 | F16G/11/12 |

* cited by examiner

Primary Examiner—David A. Bucci
Assistant Examiner—Vicky A. Johnson
(74) Attorney, Agent, or Firm—Tarolli, Sundheim, Covell, Tummino & Szabo L.L.P.

(57) ABSTRACT

The invention relates to an assembly consisting of a steering shaft and a steering wheel secured thereto. The steering shaft is provided with a groove at an end associated with the steering wheel, and the steering wheel is provided with a holding part which may engage into the groove in order to secure the steering wheel to the steering shaft in an axial direction. The holding part is movable between a release position in which it does not engage the groove, and a holding position in which it engages into the groove. A blocking element is provided, adapted to hold the holding part in the release position, and an indicator element is provided, which is connected with the holding part and is adapted to display at an outside of the steering wheel whether the holding part is in its holding position.

3 Claims, 2 Drawing Sheets

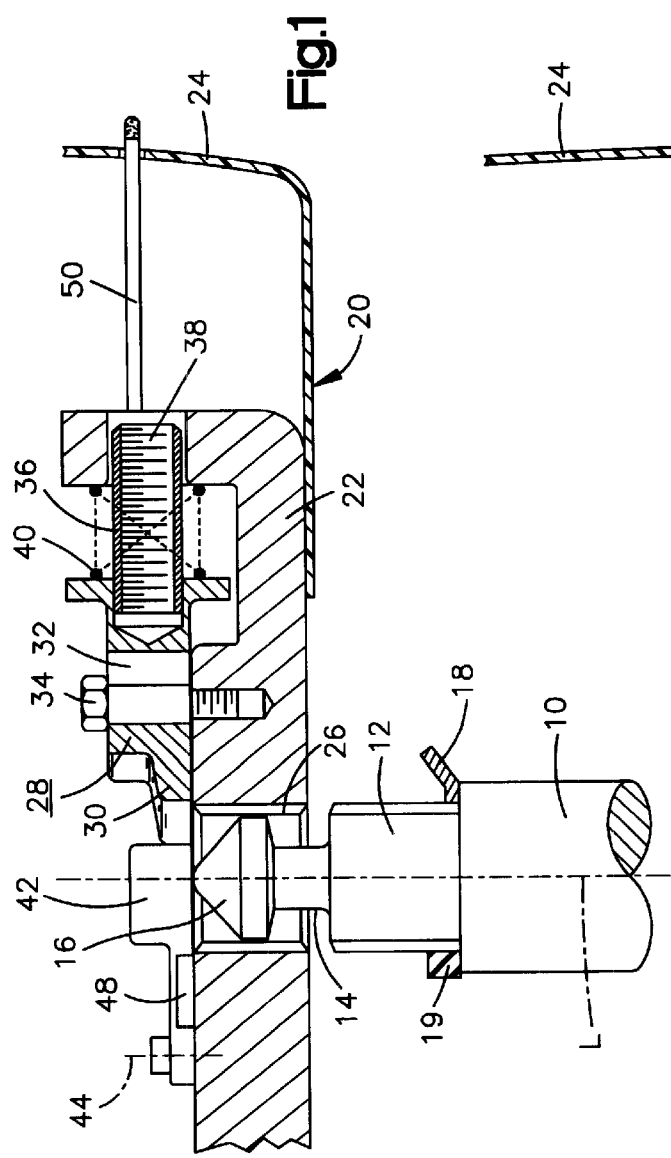
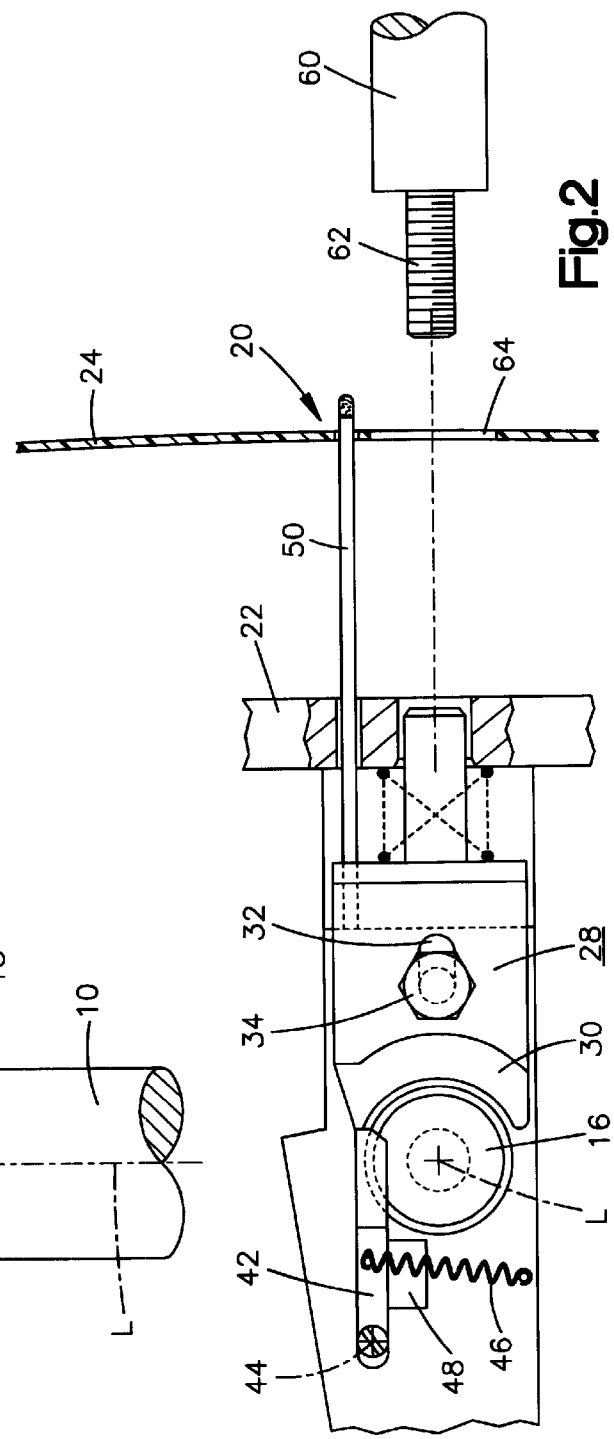

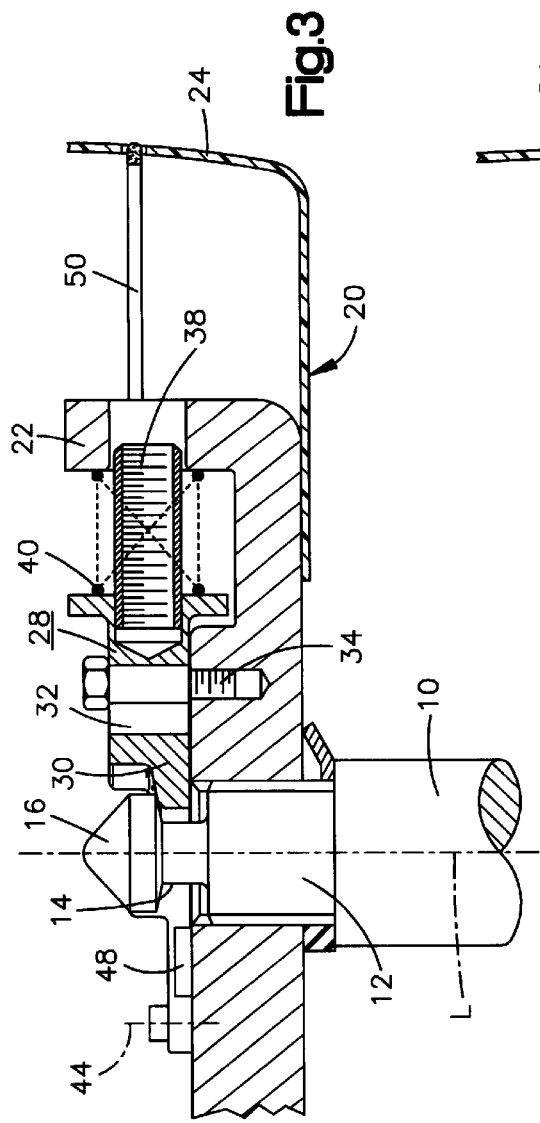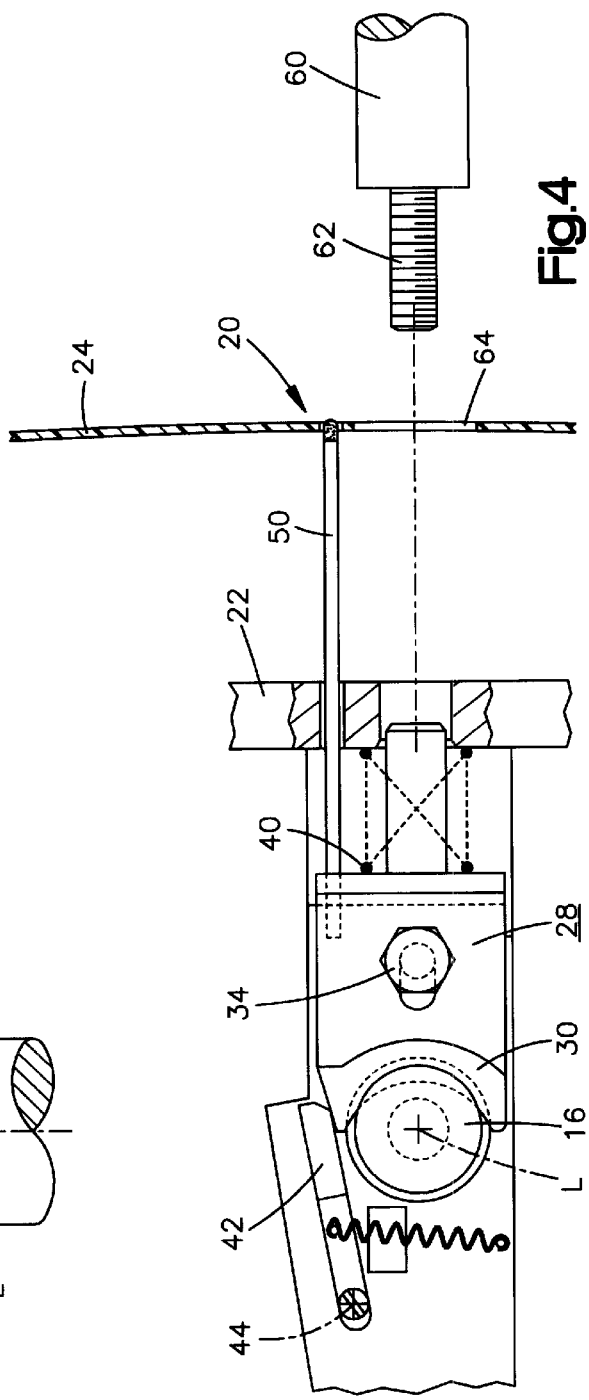

ASSEMBLY CONSISTING OF A STEERING SHAFT AND A STEERING WHEEL

TECHNICAL FIELD

The invention relates to an assembly consisting of a steering shaft and a steering wheel secured thereto.

BACKGROUND OF THE INVENTION

Such assemblies may comprise a holding part which may be realized in the manner of a snap latch which automatically snaps into a groove on the steering shaft when the steering wheel is put thereon. There arises a problem if one wants to recognize whether the holding part is actually disposed properly in the groove so that the steering wheel is reliably secured to the steering shaft or whether the holding part merely is in an intermediate position in which the steering wheel is apparently seated fixedly on the steering shaft at first, but may suddenly detach itself during later operation.

BRIEF SUMMARY OF THE INVENTION

It is the object underlying the invention to improve an assembly as mentioned above so that one may reliably recognize whether the holding part is properly disposed in the groove when the steering wheel has been put onto the steering shaft.

This is achieved in an assembly in which the steering shaft is provided with a groove at an end associated with the steering wheel and the steering wheel is provided with a holding part which may engage into the groove in order to secure the steering wheel to the steering shaft in an axial direction. The holding part is movable between a release position in which it does not engage into the groove, and a holding position in which it engages into the groove. A blocking element is provided which is adapted to hold the holding part in the release position, and an indicator element is provided, which is connected with the holding part and is adapted to display at an outside of the steering wheel whether the holding part is in its holding position. Thus, it is no longer required to have access to the interior of the steering wheel in order to recognize whether the holding part properly fixes the steering wheel on the steering shaft after the steering wheel has been put onto the steering shaft. Moreover, it is no longer required to have access to the interior of the steering wheel when the steering wheel is put onto the steering shaft since the holding part may automatically catch into the groove on the steering shaft if the blocking element and the holding part are configured adequately. This snap-in effect may then be checked by means of the indicator element.

Advantageous configurations of the invention may be taken from the subclaims.

BRIEF DESCRIPTION OF THE DRAWINGS

FIG. 1 shows a cut-away sectional view of the assembly according to the invention in a first state;

FIG. 2 is a plan view of the assembly of FIG. 1;

FIG. 3 shows a view of the assembly according to the invention in a second state, corresponding to the one of FIG. 1; and FIG. 4 shows a view of the assembly of FIG. 3, corresponding to the one of FIG. 2.

DETAILED DESCRIPTION OF THE PREFERRED EMBODIMENT

The assembly according to the invention consists of a steering shaft 10 and a steering wheel 20 connectable therewith.

Steering shaft 10 comprises a longitudinal axis L and a portion 12 having a reduced diameter and being provided with a serration on its outside. This portion 12 is followed by a circumferential groove 14 so that there is provided a further reduced diameter in this region. Groove 14 is followed by a head 16, the outer diameter of which is slightly lesser than the inner diameter of portion 12, but greater than the inner diameter of the groove, and which is conically tapered. A Belleville spring 18 is disposed at the junction between steering shaft 10 and portion 12. As an alternative, a rubber buffer 19 may be provided, too.

Steering wheel 20 comprises a skeleton 22, which has a supporting function, as well as a body 24. The latter consists of plastics, for instance, and surrounds the steering wheel skeleton 22. All functional parts of the steering wheel are disposed in the interior of body 24 such that they are not visible from outside and are protected against outer influences.

In skeleton 22, there is formed a receiving opening 26 provided with a serration which is complementary to the serration of portion 12 of the steering shaft. Opening 26 serves for receiving the portion 12 of the steering shaft, the two serrations serving for connecting the steering shaft and the steering wheel so as to be rotationally fixed.

A holding part 28, which is formed as a slide in this case, is provided on skeleton 22. Slide 28 comprises an edge portion 30, which is provided for engaging groove 14, as well as an elongated hole 32 through which a fastening screw 34 extends.

On slide 28, there is further provided a guide bush 36 which extends in a radial direction with respect to the central axis of opening 26. Guide bush 36 is inserted in a bore on slide 28 and fixedly connected with the slide there. An internal thread 38 is provided in the interior of guide bush 36, the function of which will be discussed below.

One end of a compression spring 40 is supported on slide 28, which spring concentrically surrounds guide bush 36 and has its other end bearing against skeleton 22. Compression spring 40 drives slide 28 from the release position shown in FIGS. 1 and 2 into the holding position shown in FIGS. 3 and 4.

On skeleton 22, there is further mounted a blocking element 42 which may be pivoted about an axis 44. A tension spring 46 engages blocking element 42 for driving the blocking element to bear against a stop 48. In this position, in which the end of the blocking element facing away from axis 44 slightly protrudes into opening 26, slide 28 bears against the blocking element so that it may not be displaced from the release position into the holding position by compression spring 40.

Finally, an indicator element 50, which is configured to be a pin in this case, is provided on slide 28. One end of the pin is directly connected with slide 28 and the other end slightly protrudes from body 24 via a through opening. The protruding end is marked in some color so that it is easier to discern.

Steering wheel 20 is secured on steering shaft 10 in the following manner: when the steering wheel is being put onto steering shaft 10, blocking element 42 is pushed outwardly away from axis L by head 16 of steering shaft 10 against the action of compression spring 46. This results in that slide 28 is no longer held by the blocking element; however, slide 28 has its edge 30 bearing against the periphery of head 16. It is only when steering shaft 10 has been pushed far enough into steering wheel skeleton 22 that edge 30 of slide 28 can enter groove 14, and slide 28 will then be displaced by compression spring 40 from the position shown in FIGS. 1 and 2 into the position shown in FIGS. 3 and 4. In the holding position then taken by slide 28, steering wheel 20 is secured on steering shaft 10 in the axial direction. Since the surfaces of edge 30 and groove 14, which cooperate with each other, are configured to be slightly oblique, there results a wedge effect which leads, together with Belleville spring 18 and rubber buffer 19, respectively, to that any clearance between the steering wheel and the steering shaft is eliminated.

When slide 28 is shifted from its release position into its holding position, pin 50 will be entrained. The end of the pin, which is marked in some color, will thereby be retracted into the steering wheel so that it is approximately flush with the outer surface of body 24. This may easily be recognized optically and the person fitting the steering wheel may be certain that the holding part is in the proper holding position; otherwise the end of pin 50, which is marked in some color, would project beyond the outer surface of the steering wheel.

Since the end of blocking element 42, which cooperates with slide 28, is realized to have a thickness which is greater than the thickness of edge 30, as measured along longitudinal axis L, and also greater than the width of groove 14 blocking element 42 cannot engage groove 14, when the steering wheel has been put onto steering shaft 10, in which it would prevent a later removal of the steering wheel from the steering shaft.

When the steering wheel is to be removed from the steering shaft again, a tool 60, which is represented schematically and has an external thread 62 complementary to internal thread 38, is inserted into body 24 via an opening 64 and screwed into internal thread 38. Subsequently, slide 28 may again be pulled from the holding position into the release position by means of tool 60. In the process, after steering shaft 10 has been pulled out of the steering wheel, blocking element 42 will snap back into the initial position shown in FIGS. 1 and 2, where it blocks slide 28 in the release position.

In the claims:

1. An assembly comprising a steering shaft and a steering wheel secured thereto, said steering shaft being provided with a groove at an end associated with said steering wheel and said steering wheel being provided with a holding part which may engage said groove in order to secure said steering wheel to said steering shaft in an axial direction, said holding part being movable between a release position in which it does not engage into said groove, and a holding position in which it engages into said groove, and an indicator element being provided, which is connected with said holding part and is adapted to display at an outside of said steering wheel whether said holding part is in said holding position, said indicator element being a pin, one end of which is connected with said holding part and another end of which is visible from said outside steering wheel, said visible end of said pin protruding beyond said steering wheel when said holding part is in said release position and is flush with said steering wheel when said holding part is in said holding position.

2. The assembly according to claim 1, wherein a recess bore is provided on said holding part, into which a bore tool may be screwed by means of which said holding part may be brought into said release position.

3. The assembly according to claim 1, wherein a blocking element adapted to hold said holding part in said release position is provided and wherein a portion of said holding part engaging into said groove has a lesser height than a portion of said blocking element cooperating with said holding part.

* * * * *